(12) United States Patent
Rouet et al.

(10) Patent No.: US 7,970,193 B2
(45) Date of Patent: Jun. 28, 2011

(54) IMAGE PROCESSING SYSTEM FOR DISPLAYING INFORMATION RELATING TO PARAMETERS OF A 3-D TUBULAR OBJECT

(75) Inventors: Jean-Michel Rouet, Paris (FR); Maxim Fradkin, Paris (FR); Franck Laffargue, Poissy (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1051 days.

(21) Appl. No.: 11/570,520

(22) PCT Filed: Jun. 14, 2005

(86) PCT No.: PCT/IB2005/051951
§ 371 (c)(1),
(2), (4) Date: Dec. 13, 2006

(87) PCT Pub. No.: WO2006/000942
PCT Pub. Date: Jan. 5, 2006

(65) Prior Publication Data
US 2007/0216678 A1    Sep. 20, 2007

(30) Foreign Application Priority Data
Jun. 23, 2004 (EP) ..................................... 04300391

(51) Int. Cl.
*G06K 9/00* (2006.01)
(52) U.S. Cl. ........................................ 382/131; 382/154
(58) Field of Classification Search .................. 382/128, 382/130, 131, 154; 600/416, 425, 481; 128/920
See application file for complete search history.

(56) References Cited

U.S. PATENT DOCUMENTS 5,825,908 A * 10/1998 Pieper et al. .................. 382/131
5,891,030 A * 4/1999 Johnson et al. ............... 600/407
6,201,543 B1 * 3/2001 O'Donnell et al. ........... 345/420

(Continued)

FOREIGN PATENT DOCUMENTS
WO           01 01859 A1    1/2001

OTHER PUBLICATIONS

Subasic et al. (2002) "Segmentation of abdominal aortic aneurysm using deformable models." Proc. East-West-Vision 2002, pp. 61-66.*

(Continued)

*Primary Examiner* — Bhavesh Mehta
*Assistant Examiner* — Barry Drennan (57) ABSTRACT

An image processing system, for processing a 3-D image of a 3-D substantially tubular structure (AAA), formed of a lumen (LUM) limited by a wall (5,6), comprising processing means (102) for segmenting the 3-D external or internal surface of the structure; estimating a local parameter such as the local wall thickness (T) or diameters; and display means (105) for displaying the 3-D surface of segmentation with zones colorized according to a color code, so that to indicate the local parameter values in said zones. The system may comprise processing means to generate (107) a 3-D virtual cylinder and projecting (108) the color-coded 3-D segmentation surface onto the 3-D virtual cylinder surface colorized according to the same color-code; and projecting the 3-D virtual cylinder surface onto a 2-D color-coded map; and display means for displaying the 2-D color-coded map with colorized zones indicating the local parameter values (T) in said zones (109).

16 Claims, 7 Drawing Sheets

U.S. PATENT DOCUMENTS

| | | | |
|---|---|---|---|
| 6,301,498 B1 * | 10/2001 | Greenberg et al. | 600/425 |
| 6,491,636 B2 | 12/2002 | Chenal et al. | |
| 6,718,193 B2 | 4/2004 | Knoplioch et al. | |
| 6,928,314 B1 * | 8/2005 | Johnson et al. | 600/407 |
| 7,233,330 B2 * | 6/2007 | Moreau-Gobard et al. | 345/424 |
| 2001/0031920 A1 * | 10/2001 | Kaufman et al. | 600/431 |
| 2002/0193687 A1 | 12/2002 | Vining et al. | |
| 2003/0120171 A1 * | 6/2003 | Diamantopoulos et al. | 600/549 |
| 2004/0249270 A1 * | 12/2004 | Kondo et al. | 600/425 |
| 2007/0053554 A1 * | 3/2007 | Fayad et al. | 382/128 |

OTHER PUBLICATIONS

Eusemann et al. (May 2001) "3D quantitative visualization of altered LV wall thickening dynamics caused by coronary microembolization." SPIE vol. 4321, pp. 100-107.*

Ma et al. (Feb. 2004) "Three-dimensional geometrical characterization of cerebral aneurysms." Annals of Biomedical Engineering, vol. 32 No. 2, pp. 264-273.*

O'Donnell et al. (Mar. 22, 1997) "A new model for the recovery of cylindrical structures from medical image data." Proc. 1st Joint Conf. Computer Vision, Virtual Reality, and Robotics in Medicine and Medical Robotics and Computer-Assisted Surgery, LNCS vol. 1205, pp. 223-232.*

Bulpitt, A. J., et al.; Spiral CT of abdominal aortic aneurysms: Comparison of segmentation with an automatic 3D deformable model and interactive segmentation; 1998; SPIE Conf. on Image Processing; vol. 3338; pp. 938-946.

Feng, J., et al.; A 3D Geometric Deformable Model for Tubular Structure Segmentation; 2004; IEEE Proc. 10th Intl. Multimedia Modelling Conf.; pp. 174-180.

Miller, J. S. et al.; Hemodynamics of human carotid artery bifurcations: Computational studies with models reconstructed from magnetic resonance imaging of normal subjects; 1998; J. Vascular Surgery; 28(1)143-156.

Sharma, R., et al.; A Segmentation Method for Carotid Artery Atherosclerosis Plaque for MRI Contrasts and MRI Features, Oxidative Stress Markers in Coronary and Carotid Plaque; 2003; IEEE Symposium on Conputer-Based Medical Systems; pp. 323-328.

* cited by examiner

IMAGE PROCESSING SYSTEM FOR DISPLAYING INFORMATION RELATING TO PARAMETERS OF A 3-D TUBULAR OBJECT

FIELD OF THE INVENTION

The invention relates to an image processing system, having means for displaying a representation of a 3-D substantially tubular object in a 3-D image with information relating to parameters of this 3-D substantially tubular object The invention further relates to such a medical image processing system, having means, such as programs or program products, for processing medical 3-D images of 3-D substantially tubular organs. The invention particularly relates to a medical image processing system, having 3-D image processing means for displaying a representation of a blood vessel together with related geometric parameters. The invention finds a specific application in the study of the Abdominal Aorta Aneurysm (AAA) and aorta thrombus.

The invention further relates to a medical imaging apparatus connected to such a medical image processing system, having means for processing medical 3-D images of substantially tubular organs produced by said apparatus.

BACKGROUND OF THE INVENTION

U.S. Pat. No. 6,718,193 discloses a method and apparatus for displaying information concerning a tubular structure. The method includes determining a centerline of the tubular structure and a plurality of center points along that centerline, determining a plurality of cross-sections at respective center points, which cross-sections are perpendicular to the centerline, and estimating the values of the diameters associated with each of the cross-sections. The method additionally includes generating a modified image of the tubular structure by displaying a curve that represents the variations of diameter alongside the centerline. According to the method, the centerline of the tubular structure of interest is defined by using automated methods that track this centerline or manually from user input. For each point of the centerline, the cross-section that is normal to the centerline is found, and for each section, information such as the cross-sectional area, the maximum diameter and minimum diameter of the tubular structure in said plane are calculated and stored in memory. The centerline of the tubular structure, which normally shows bends, is aligned to a straight axis. Using this straightened centerline, the tubular structure is also straightened and denoted by "unfolded tubular structure". Then, along the side of the straighten image of the tubular structure, a set of curves is displayed with the quantitative information of the diameter values previously stored. In particular, the tubular structure may be a vessel. The method of the cited patent includes determining a centerline along at least a portion of the vessel, determining the characteristics of diameters in cross-sections along the centerline and generating an image of a straighten vessel using a straightened centerline. The cited patent further relates to an apparatus for displaying information concerning the vessel. The apparatus includes means for obtaining data concerning an actual vessel, and means for generating a straightened vessel having characteristics of diameters of cross-sections represented by the data. The apparatus further includes means for generating, alongside the image of the straightened vessel, a graphical image showing variation of the parameters of the actual vessel as a function of position along the straighten axis of the straighten vessel image.

SUMMARY OF THE INVENTION

It is an object of the present invention to provide an image processing system for displaying a 3-D image of a substantially tubular object together with local parameter information relating to the tubular object, which parameter information is easily readable and readily available to the user of the system.

The present invention proposes an image processing system, having means for segmenting a 3-D substantially tubular surface of the 3-D tubular object in the 3-D image, for estimating local parameters related to said object and for displaying said local parameters upon the segmented 3-D surface in a color-coded manner. The substantially tubular surface may be the internal or external wall surface of the tubular object. The local parameters may be the internal or external local diameters, the local variations of diameter or the local wall thickness or the local variations of wall thickness, or other local parameters.

The 3-D substantially tubular object may be a substantially tubular organ represented in a 3-D medical image. The tubular organ may be a blood vessel.

Thanks to the color-coding of the segmented 3-D surface, the practitioner who examines the 3-D views of this surface of the tubular object gets immediately a clear information related of the local parameter values.

Regarding blood vessels, an aneurysm is a swelling or dilatation in a part of blood vessel. An aneurysm can occur in any blood vessel, but is much more common in arteries. An Abdominal Aortic Aneurysm (AAA) is a dilatation in the abdominal part of the aorta. This is one of the commonest types of aneurysm. Aortic aneurysms present the risk of bursting. When an aortic aneurysm bursts, it is a catastrophic event in which the patient can die from internal bleeding in a matter of minutes. In most cases a burst (ruptured) aortic aneurysm is fatal. The risk of an aneurysm rupturing varies with the external aneurysm size. The larger the aortic aneurysm, the more risk of it rupturing. It has been found that once the aneurysm size increases beyond 6.0 cm, the risk of rupture increases drastically over the next year.

A way to diagnose an aneurysm is with an ultrasound scan of the abdomen, which is a simple and safe test. Surgery can be considered as the aneurysm enlarges. The surgery prevents the aneurysm from rupturing or causing other complications in the future. Before surgery, most patients will undergo CT (computed tomography) scanning to examine the aneurysm in more detail. CT provides cross-section views of the aorta.

It has been found that the shape of the aneurysm does not show a smooth and continuous increase and decrease of the aorta diameter. In the region of the AAA, both the external aorta diameter and the wall thickness increase abruptly and drastically, while the diameter of the aorta lumen does not increase considerably. The bursting often occurs at one of the junctions between the briskly enlarged region and the still normal regions of the aorta, each side of the aneurysm. Hence, the important issue is to examine the thickness of the aorta wall (called thrombus) in the region of the aneurysm.

So, it is an object of the invention to provide a medical image processing system for displaying an image of the aorta together with local geometric information relating to the thrombus in a region of AAA. It is a further object of the invention to provide such a system for displaying thrombus related geometric information that is easily readable and usable. Favorably, the geometric information may be the local thrombus thickness.

Until now, only displaying curves of diameter variations of tubular structures has been disclosed in the prior art. Visualizing curves of both the lumen diameter and the thrombus diameter in 3-D does not allow assessment of the real 3-D distances between both surfaces. However, abnormal thickness of the thrombus around the AAA lumen is considered as an indicator of possible malignancy. Thus solving the problem of thrombus thickness estimation and display in 3-D is most important.

So, the present invention proposes a medical image processing system, having image processing means for segmenting the AAA external or internal substantially tubular surface and for computing the thickness of the thrombus, deriving a mapping between the thickness value and a color-code, and colorizing the AAA surface of segmentation, according to this color code.

The system of the invention solves the problem of AAA medical examination in that this system permits of easily estimating the thrombus thickness and clearly displaying this information. Thanks to the color-coding of the segmented aorta external or internal surface, the practitioner who examines the views of this surface in the AAA region, gets immediately a clear information related of the thrombus thickness values and is even able to determine which region of the thrombus is the thickest in 3-D.

Thus, unlike in the prior art, the thrombus thickness is evaluated on a color-coded surface representation of the thrombus (outer wall or inner wall of the AAA), using the corresponding color map and this most important information of thrombus thickness is easily available and readable.

A surface of a substantially tubular organ like an artery can be segmented based on discrete deformable models. The deformable model, which may be either of the kind called two-Simplex Mesh, triangular Mesh or of any other kind of active contour Models, can fit such a tubular organ whose wall presents the deformation called thrombus. The outer surface of the AAA is represented as a mesh on which the thrombus thickness is available, in a color-coded manner, at any point of the mesh.

Even though very meaningful, the 3-D view of the colorized segmented surface requires some user interaction in order to inspect every side of said segmented surface in 3-D. This applies particularly to the segmented 3-D surface of the thrombus in AAA region.

The present invention proposes an image processing system having further processing means for mapping the color-coded segmented surface onto a virtual cylinder surface. This is performed by projection of the colorized segmented surface onto the virtual cylinder surface. This comprises the computation of the centerline of the tubular object and the generation of the virtual cylinder centered on this centerline. The image processing system has display means to permit a user of visualizing the 3-D color-coded segmentation surface of the tubular object and the corresponding color-coded surface of the virtual cylinder.

Unlike the prior art, no straightening of the tubular object centerline is imposed.

Preferably, the image processing system has processing means to unfold the color-coded surface of the virtual cylinder by projecting said surface onto a plane, which plane is color-coded in correspondence to the color-coded surface of the virtual cylinder and to the color-coded segmentation surface of the tubular object.

In the study of the thrombus in a AAA region, the color-coded flat projection of the unfolded thrombus has proven to be most simple to interpret and most useful for the practitioner.

BRIEF DESCRIPTION OF THE DRAWINGS

The invention is described hereafter in detail in reference to the following diagrammatic drawings, wherein:

FIG. 5C is a color-coded representation of the thrombus thickness on the aorta segmented surface in the same region of AAA in an opposite orientation, while

DESCRIPTION OF EMBODIMENTS

The present invention relates to an image processing system, having means for displaying a 3-D substantially tubular object in a 3-D image together with local information relating to a parameter of said tubular object. This local parameter is favorably a geometric parameter. A geometric parameter of a 3-D substantially tubular object may be the local diameter or diameter variation, the local thickness of the object wall or the local thickness variation or another local parameter.

The present invention proposes an image processing system, having means for segmenting a substantially tubular surface of a substantially tubular object in a 3-D image, for estimating the local parameter of said object and for displaying the local parameter values upon the segmented surface in a color-coded manner. The tubular surface may be the outer or the inner wall surface of the tubular object.

The invention particularly relates to such an image processing system, having means for automatic segmentation of the surfaces of a 3-D substantially tubular object in a 3-D image, comprising means of fitting a 3-D discrete deformable model onto the wall surfaces of said 3-D object, and having means for displaying the segmented object with information relating to the above defined geometric parameters.

The invention particularly relates to a medical image processing system for processing 3-D medical images. This system has processing means for estimating the local diameters or the local thickness of blood vessel walls or the variation of said parameters and has display means for displaying images of the blood vessel together with easily readable information of the local geometric parameters of the vessel walls.

In particular, this medical image processing system has means for displaying geometric information relating to the AAA, and specifically to the thrombus thickness, in a way that is easily readable and usable.

According to the invention, this medical image processing system has means for segmenting the aorta external or internal wall; estimating the thickness of the thrombus, and displaying the thrombus thickness on the aorta external or internal segmented surface in a color-coded manner.

Thus, the practitioner who examines the views of the AAA gets immediately clear information related to thrombus thickness. Because of the color-coding and of the representation in 3-D, the practitioner knows immediately the thickness of every region of the thrombus and in particular, which region of the thrombus is the thickest in 3-D.

This medical image processing system has segmentation means to segment the thrombus outer surface or inner surface and image processing means for computing the thickness of the thrombus, deriving a mapping based on the thickness value and a color-code, and colorizing the AAA surface of segmentation, accordingly with this color code.

So, the thrombus thickness is directly read on the color-coded thrombus segmentation surface using a corresponding color map. This most important information of thrombus thickness is easily available, at any point of the mesh.

The user may however have problems to inspect every side of the tubular object and in particular every side of the AAA in 3-D. The user must interact with the system to inspect the AAA all around.

For solving this problem, this system has further processing means for mapping the color-coded segmented surface onto a virtual cylinder. This can be performed by projection of the segmentation mesh onto a virtual cylinder surface.

So, the segmented outer or inner surface of the Aorta, together with thrombus thickness color-coded information, can be projected onto the virtual cylinder surface.

This system has processing means to construct the virtual cylinder comprising the computation of the tubular object centerline. When the tubular object is the aorta, the system has processing means to compute the aorta lumen centerline, on which the virtual cylinder will be fit. The virtual cylinder is centered on the tubular object centerline. This centerline is not necessarily straight. The medical image processing system has display means to permit a user to visualize the 3-D color-coded segmentation surface of the tubular object and the corresponding color-coded surface of the virtual cylinder.

This system has further processing means of unfolding the color-coded surface of the virtual cylinder and projecting this surface onto a plane. Hence, this plane is color-coded in correspondence to the color-coded outer surface of the virtual cylinder and to the color-coded segmentation surface of the tubular object.

When studying the AAA, the plane is color-coded in correspondence to the color-coded surface of the virtual cylinder and to the color-coded segmentation surface of the thrombus. This color-coded flat projection of the unfolded virtual cylinder has proven to be most simple to interpret and most useful for the practitioner. With the flat representation, the user estimates the thrombus thickness of the anterior and posterior face of the AAA at one glance.

Figure 1A:
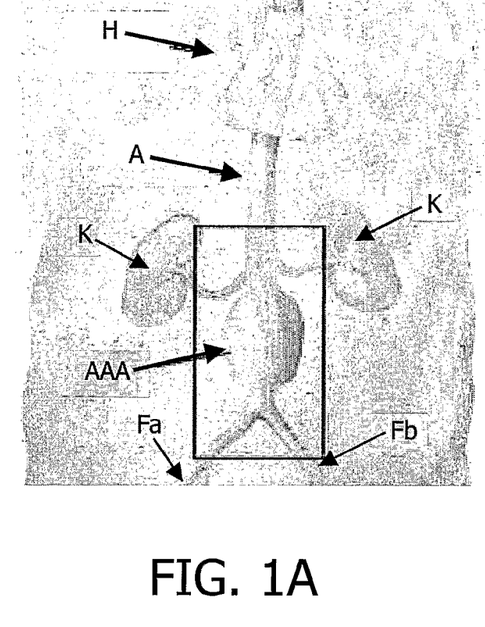
FIG. 1A and FIG. 1B illustrate an Abdominal Aorta Aneurysm.
Figure 1B:
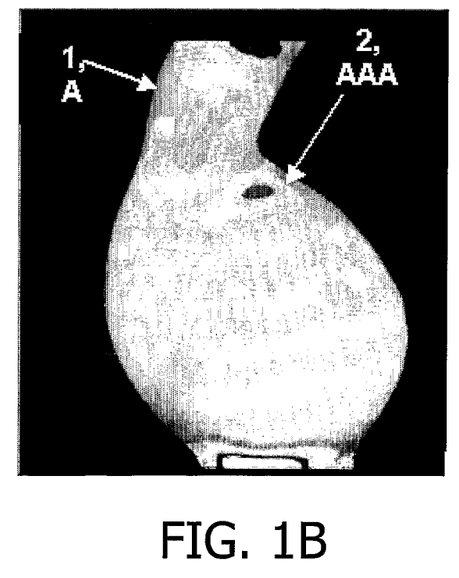

FIG. 1A shows a substantially tubular organ, which is the aorta, denoted by A, in a region of Abdominal Aorta Aneurysm, denoted by AAA. In this schematic illustration, H is the heart, K the kidneys, Fa and Fb are the femoral arteries. FIG. 1B illustrates schematically a normal part 1 of the aorta A and a part 2 with abnormal thickness of the thrombus in the region of AAA.

Figure 2:
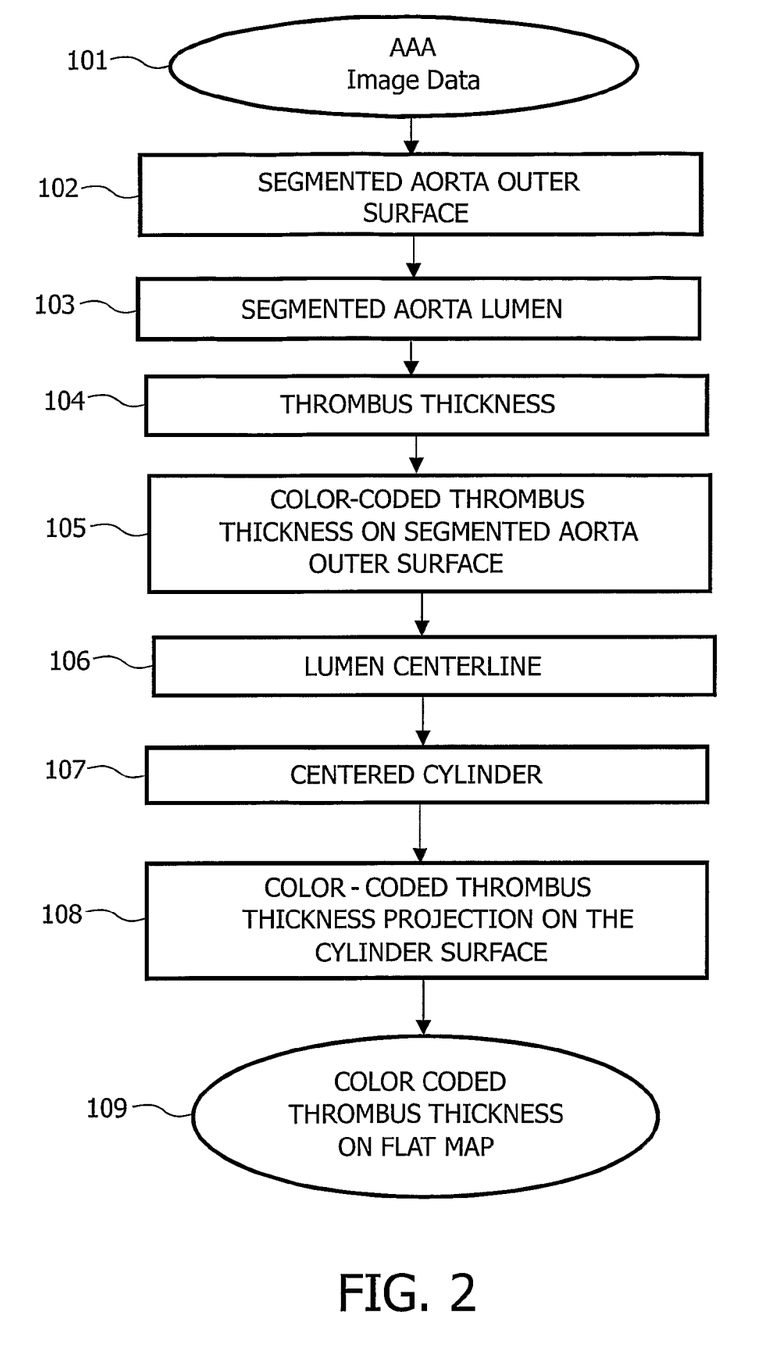
FIG. 2 is a diagrammatic representation of the processing means of the invention.

Acquisition means 101: FIG. 2 is a diagram illustrating schematically the main processing means of the imaging system of the invention in a medical application to display thrombus thickness information related to a AAA region.

Referring to FIG. 2, the medical imaging system has acquisition means 101 to acquire 3-D digital images of the aorta in the region of AAA. Such digital images can be acquired by ultrasound systems, CT systems or X-ray apparatus or by other systems known to those skilled in the art. The medical three-dimensional (3-D) digital images may be acquired in gray levels.

Figure 3A:
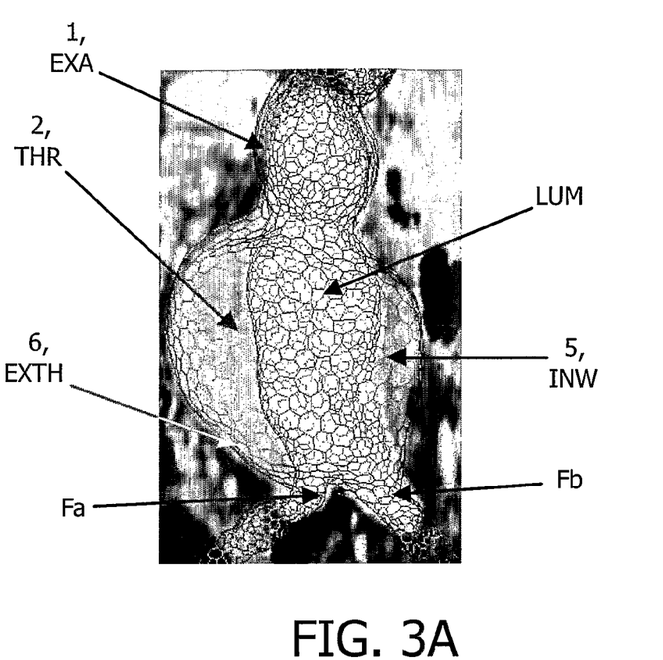
FIG. 3A is a mesh representation of the aorta lumen and the aorta thrombus.
Figure 3B:
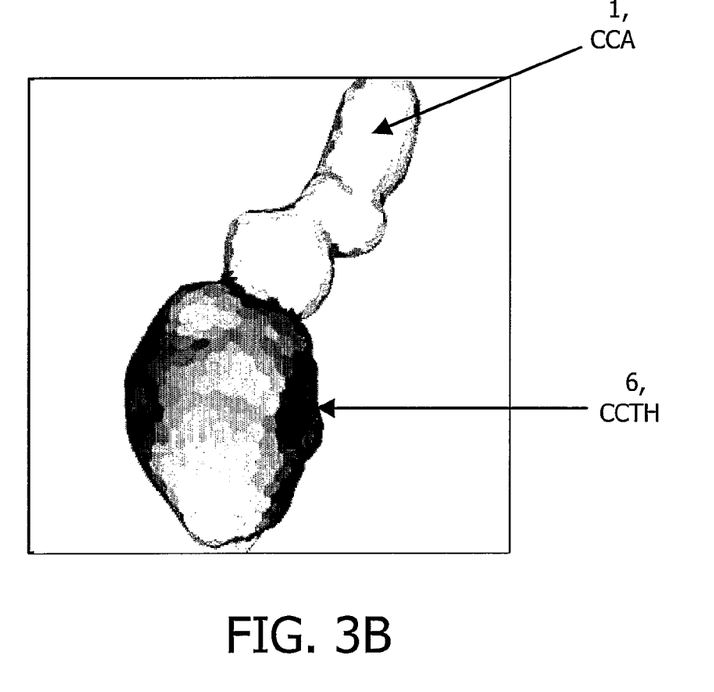
FIG. 3B is a color-coded representation of the thrombus thickness on the segmented surface of the aorta in the region of AAA.

External surface segmentation means 102: Referring to FIG. 2, FIG. 3A and FIG. 3B, the imaging system has means 102 for segmenting the external surface 6 of the aorta for example using a mesh model EXW representing the boundary 6 of the aorta in the region of AAA.

The image segmentation technique is favorably based on the utilization of 3-D deformable models, called active contours. The deformable model may be either of the kind called two-Simplex Mesh, triangular Mesh or of other kind of active contour Models. Any technique of creating a 3-D deformable model can be used without restriction. The segmentation operation consists in mapping the 3-D deformable Model onto the 3-D aorta external surface in the region of AAA.

The mesh representing the segmentation surface of the aorta external surface is denoted by EXTH, while parts of mesh are extended to segment the external surfaces of the femoral arteries Fa, Fb.

Figure 4A:
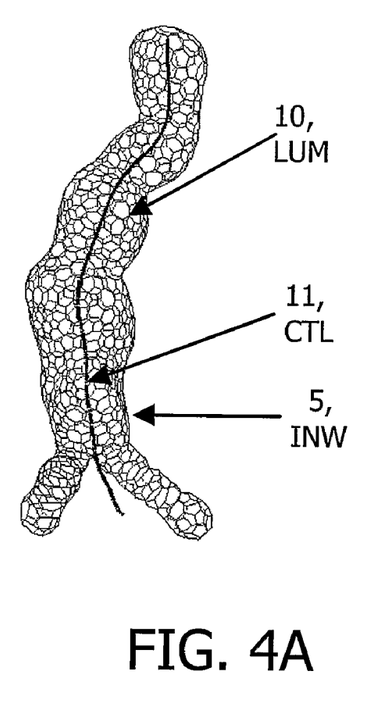
FIG. 4A shows a mesh representation of the segmented lumen of the aorta with the estimated centerline and FIG. 4B shows a 3-D representation of the lumen with the 3-D virtual cylinder generated from the centerline.

Lumen Segmenting means 103: Referring to FIG. 2 and FIG. 4A, the medical imaging system has processing means 103 for segmenting the aorta internal surface 5 for example using a mesh model INW representing the boundary of the lumen LUM in the region of AAA.

Favorably the segmentation technique for segmenting the lumen boundary surface 5 is the same as the segmentation technique for segmenting the aorta external surface 6 described previously.

FIG. 3A and FIG. 4A illustrate the mesh denoted by INW forming the segmentation surface of the aorta internal surface 5, which is the boundary of the lumen LUM, while parts of mesh are extended to segment the internal surfaces of the femoral arteries Fa, Fb.

Thrombus thickness computation means 104: Referring to FIG. 2, the system has further means 104 for computing the thrombus thickness T. Each point of the outer surface EXA, EXTH is associated with its distance to the inner surface INW of the aorta wall to determine the thrombus thickness T. The thrombus 2, which is the thick wall in the region of AAA, is denoted by THR in FIG. 3A and FIG. 6. In the case of AAA, the thrombus thickness T may be much more important than the usual thickness of the aorta wall in the normal part 1 of the aorta. Also, the thickness T may vary greatly from one region of the AAA to another.

Thrombus thickness color-coding means 105: Referring to FIG. 2, the imaging system of the invention has means 105 to provide a color-coded representation of the aorta wall thickness and of the thrombus thickness T displayed on the external segmentation surface of the aorta denoted by EXA and EXTH, as illustrated by FIG. 3B.

Each point of the outer surface EXA, EXTH is associated with its distance to the inner surface INW, called thrombus thickness T, and then color-coded. In FIG. 3B, the color-coded representation of the aorta wall thickness in the normal region 1 is denoted by CCA and the color-coded representation of the thrombus thickness in the AAA region 2 is denoted by CCTH. A color reference display permits the user of determining immediately the thrombus thickness by the examination of the 3-D view of the aorta as shown in FIG. 3B.

Problem of estimating thrombus thickness only knowing the segmentation surfaces: Referring to FIG. 3A, which shows the internal wall 5, the thrombus 2 and the external wall 6 of the aorta altogether, it is to be noted that directly visualizing both the lumen/thrombus and the thrombus/wall interfaces in 3-D did not allow assessment of the real 3-D distances between both surfaces, because of perspective projection effect.

Advantage of the color-coded outer surface: Instead, referring to FIG. 3B, on the color-coded surface representation of the thrombus CCTH, the thrombus thickness T can be easily evaluated knowing the corresponding color reference map. Thus, according to the present invention, the view of FIG. 3B permits of solving the problem of FIG. 3A.

Figure 5A:
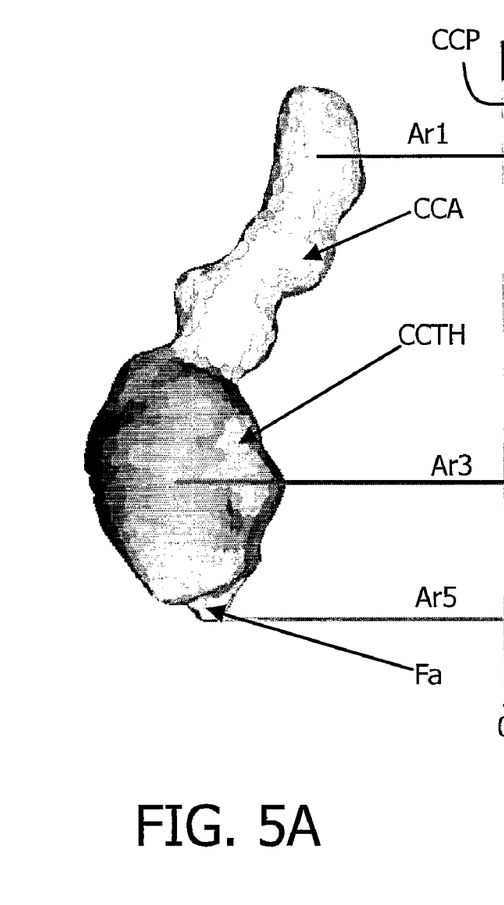
FIG. 5A is a color-coded representation of the thrombus thickness on the aorta segmented surface in the region of AAA in a first orientation.
Figure 5B:
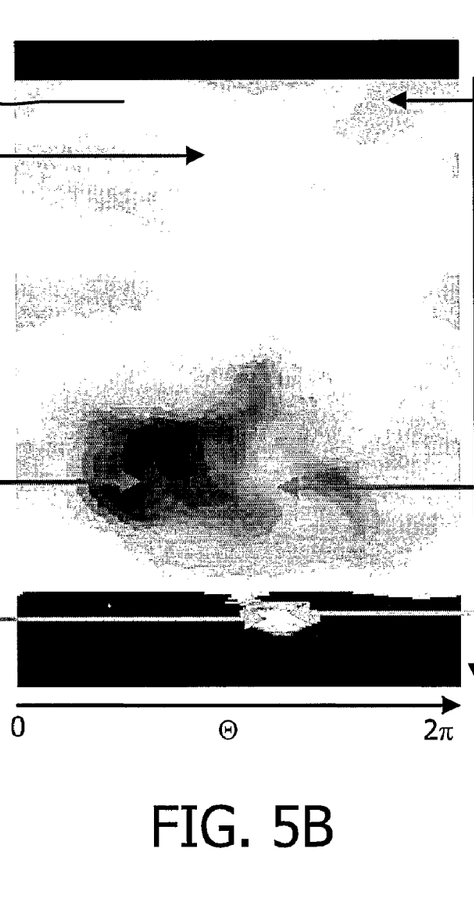
FIG. 5B is the projection of the color-coded thrombus thickness on the virtual cylinder that has been unfolded and flattened.
Figure 5C:
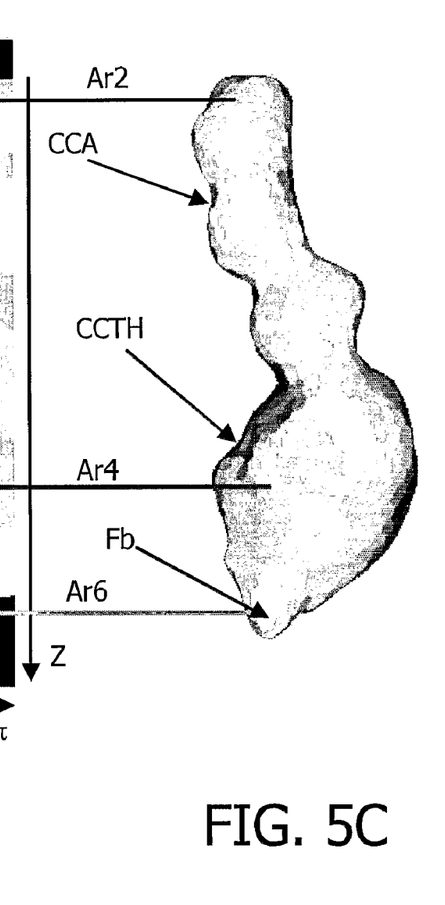

Problem of the 3-D view: the anterior and posterior faces are not viewed together: Even though very meaningful, the view of FIG. 3B requires some user interaction in order to inspect every side of the AAA. In particular, it is not possible to simultaneously visualize the anterior and posterior sides of the AAA as illustrated by FIG. 5A and FIG. 5C. The imaging system of the invention has further means to solve this problem by offering a way to unfold the color-coded segmentation surface CCTH by first projecting it onto a virtual cylinder CYL and then by unfolding the cylinder for forming a color-coded 2-D projection map CCP as illustrated by FIG. 5B.

Means 106 for lumen centerline creating: Referring to FIG. 2 and to FIG. 4A, the imaging system comprises path-tracking means 106 for the creation of a 3-D path 11. This 3-D path may advantageously be the centerline CTL of the aorta lumen LUM. Path-tracking tools are already known to those skilled in the art and may be used to determine a set of ordered points for the centerline CTL of the lumen LUM. FIG. 4A shows a centerline CTL extracted from the lumen segmentation. This centerline is then used as the center of a virtual cylinder 12.

Figure 4B:
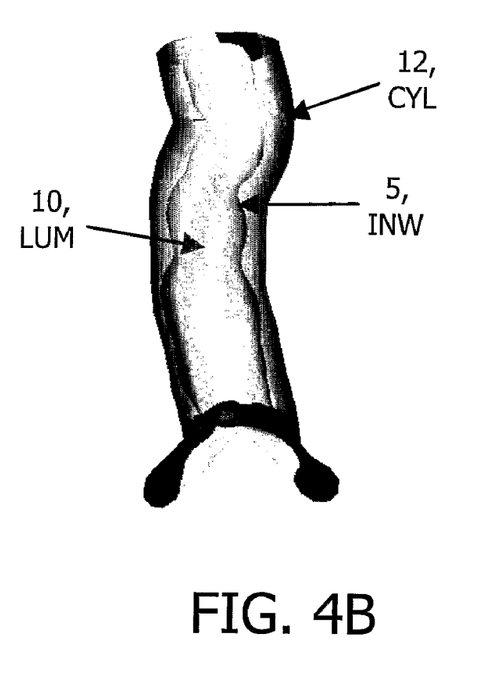
Figure 6:
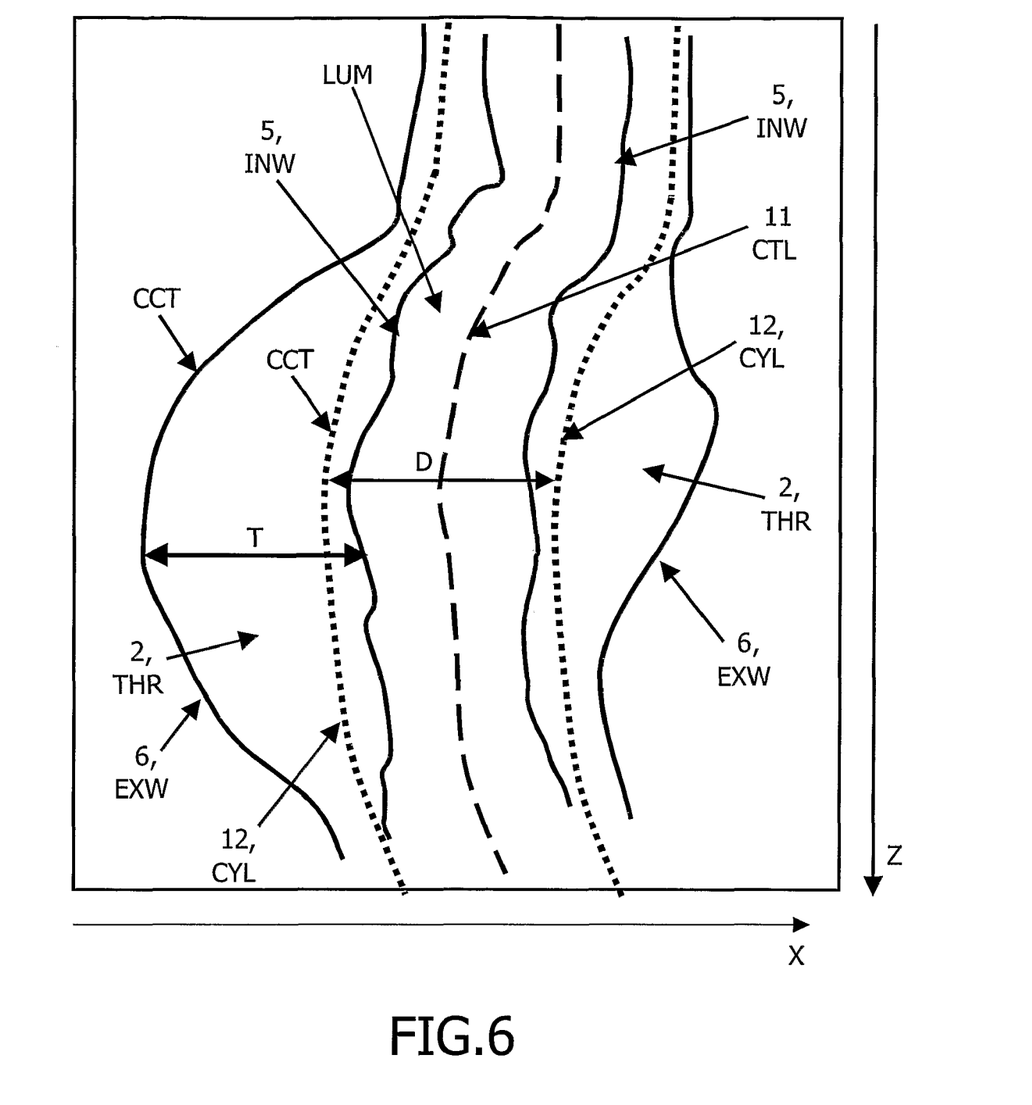
FIG. 6 shows a schematic section of the aorta lumen, aorta thrombus, of the lumen centerline and of the virtual cylinder along the longitudinal axis.

Means 107 for generating a centered cylinder: Referring to FIG. 2 and FIG. 4B, the imaging system has means 107 to generate the virtual cylinder 12 centered on this centerline 11. This centerline is used as the skeleton of the fitted cylinder. The diameter D of the virtual cylinder 12 is favorably of the same order as the diameter of the aorta internal surface 5 or external surface 6. For instance, the virtual cylinder diameter D may be between the value of the internal surface diameter and the external surface diameter as illustrated by FIG. 6.

Means 108 for projecting the thrombus outer surface onto the cylinder surface: Referring to FIG. 2, the imaging system has means 108 to project the color-coded segmented outer surface CCA, CCTH of the thrombus onto the virtual cylinder outer surface CYL. Each color-coded point of the segmented outer surface CCA, CCTH is associated to a point of the virtual cylinder outer surface. Hence, the virtual cylinder outer surface CYL shows a color-code representation of the thrombus thickness T.

Other embodiments: Instead of representing the thrombus thickness information onto the segmented outer surface of the aorta in a color coded manner, the user may chose to represent this information onto the segmented inner surface of the aorta. However, the segmented outer surface may provide more precise information.

Also, instead of representing the thrombus thickness information onto the segmented outer or inner surface of the aorta in a color coded manner, the user may chose to represent another information such as the inner or outer local diameter, the variation of the thickness or the variations of the diameters or other parameters.

More generally, other information than thickness or diameter may be calculated and color-coded onto the segmented outer and/or inner surface of a tubular organ, such as the variation of thickness or variation of diameter given by gradient calculations, or local strain values or extensibility values. Any information first color-coded onto the outer or inner wall surface of a substantially tubular organ are further projected onto the virtual cylinder.

Thus, instead of projecting onto the cylinder surface the segmented outer surface of the aorta with the chosen parameter information, the user may choose to project the segmented inner surface of the aorta wall with the same or another color-coded information. Projecting information such as the diameter of a surface, permits of further better inspecting this surface.

Projecting information related to an inner surface may also be particularly interesting for other tubular organs, such as the colon, the trachea, the bronchi. In certain cases, both the inner and outer segmented surfaces may be provided with color-coded information for further projection onto a respective virtual cylinder.

Means 109 for projecting the unfolded cylinder surface onto a plane: Then, the system has further means 109 to unfold the virtual cylinder. This cylinder is unfolded from a given reference, for instance the location of the spine, which results in a 2-D map, called projection map, as shown on FIG. 5B. This 2-D map, denoted by CCP, is color-coded with the AAA thrombus thickness T.

The projection map can be used to display not only the thrombus thickness T as color-coded information, but also any other information, like the derivatives of the thickness (corresponding to the rate of change of the thickness), which is useful to evaluate the locations where the thrombus might break.

The projection map can also be used to display information related to the inner wall as above-described.

On FIG. 5B, the arrows referenced Ar1, Ar2, Ar3, Ar4, Ar5 and Ar6 indicate the corresponding color-coded zones between the anterior face of FIG. 5A, the posterior face of FIG. 5C and the projection map CCP.

FIG. 6 is a section x, z of the aorta and thrombus along the longitudinal axis z of the aorta, showing the lumen LUM; the centerline 11, CTL; the virtual cylinder 12 with a diameter D, whose outer surface CYL has the projected representation of the color-coded thrombus thickness CCT; the aorta inner wall or lumen boundary 5 with the mesh INW; the aorta outer wall 6 with the mesh EXW, which is color-coded according to CCT with the thrombus thickness T.

Medical Viewing System and Apparatus

Figure 7:
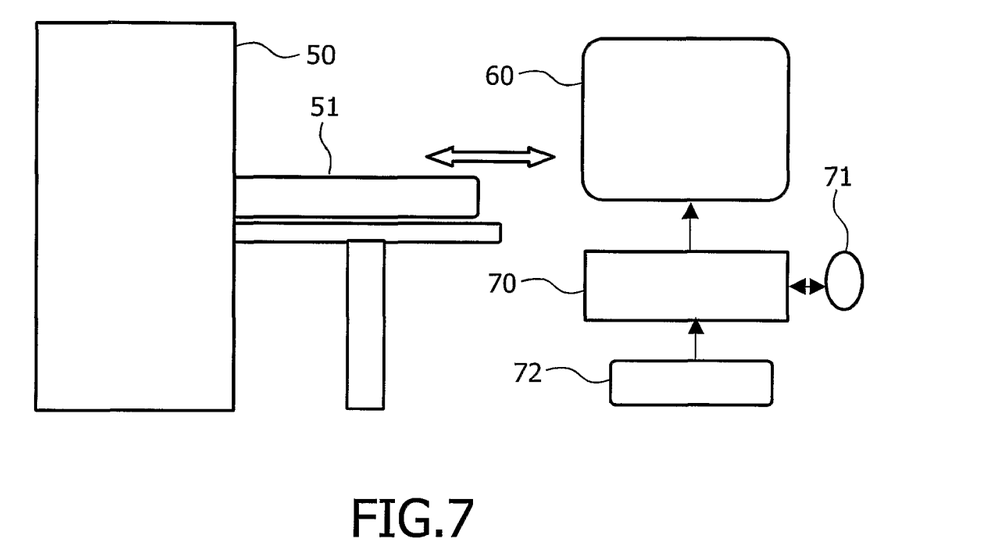
FIG. 7 illustrates a medical apparatus with a viewing system having means for carrying out the invention.

The above-described steps can be carried out by the viewing system of the invention. FIG. 7 shows the basic components of an embodiment of a medical examination apparatus coupled to an image viewing system in accordance to the present invention. The medical examination apparatus 50 may include a bed 51 on which the patient lies or another element for localizing the patient relative to the imaging apparatus. The medical imaging apparatus 50 may be a CT scanner or other medical imaging apparatus such as x-rays or ultrasound apparatus. The image data produced by the apparatus 50 is fed to the image processing system, comprising data processing means 70, such as a general-purpose computer. The data processing means 70 is typically associated with display means, such as a monitor 60, and an input device, such as a keyboard 72, or a mouse 71, pointing device, etc. operative by the user so that he can interact with the system. The data processing means 70 is programmed to processing medical image data according to invention. In particular, the data processing means 70 has computing means and memory means to carry out the invention. A computer program product having pre-programmed instructions to carry out the invention may also be implemented.

The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. An image processing method comprising:
   segmenting a 3-D external surface and a 3-D internal surface of an artery;
   computing a centerline along a longitudinal axis of the artery;
   generating a 3-D virtual cylinder different from the segmented 3-D external surface and different from the segmented 3-D internal surface, the generating including:
      centering the 3-D virtual cylinder on the centerline of the artery;
      estimating a wall thickness of the artery at a plurality of locations;
      mapping each wall thickness to a color code; and
      projecting the color-coded wall thickness onto the 3-D virtual cylinder surface;
   displaying the 3-D virtual cylinder.

2. The image processing method of claim 1, wherein the artery is an aorta and aorta thrombus in an Abdominal Aorta Aneurysm region, the aorta thrombus being larger in diameter than the aorta.

3. The image processing method of claim 1, further comprising:
   unfolding the color-coded 3-D virtual cylinder surface to generate a 2-D surface, defining a 2-D color-coded thickness map.

4. The image processing method of claim 1, wherein segmenting the 3-D external surface and the 3-D internal surface is performed using 3-D deformable active contour models.

5. The image processing method of claim 4, wherein the 3-D deformable models are two-simplex mesh or triangular mesh.

6. The image processing method of claim 1, further including:
   mapping a rate of change of the thickness to a corresponding color and colorizing an outer surface of the virtual cylinder with the corresponding color to generate a color-coded rate of thickness change image; and
   displaying the rate of thickness change image.

7. The method of claim 1, further including:
   projecting one of the segmented external surface and the segmented internal surface onto the 3D virtual cylinder.

8. The method of claim 7, further including:
   unfolding the 3D virtual cylinder to create a 2D color-coded thickness map of the projected segmented surface.

9. The method of claim 1, further including:
   estimating a diameter of the 3D internal surface and a diameter of the 3D external surface.

10. A non-transitory computer-readable medium which stores a computer program which when being executed by a processor, controls the processor to perform a method comprising:
    segmenting a 3-D external surface and a 3-D internal surface of an artery;
    computing a centerline along a longitudinal axis of the artery;
    generating a 3-D virtual cylinder different from the segmented 3-D external surface and different from the segmented 3-D internal surface, the generating including:
       centering the 3-D virtual cylinder on the centerline of the artery;
    estimating a wall thickness of the artery at a plurality of locations;
    mapping each wall thickness to a color code;
    projecting the color-coded wall thickness onto the 3-D virtual cylinder surface; and
    displaying the 3-D virtual cylinder.

11. An image processing system which processes a 3D image of a tube-like anatomical structure, the system comprising:
    at least one processor programmed to:
       receive a 3-D image of a tube-like anatomical structure,
       operate on the received 3-D image to segment at least an outer and an inner surface of the tube-like anatomical structure,
       determine thicknesses of zones of the tube-like anatomical structure between the outer surface of the tube-like anatomical structure and the inner surface of the tube-like anatomical structure,
       map both the thicknesses of the zones and a rate of change of the thicknesses to corresponding colors,
       colorizing a surface with colors corresponding to a selectable one of the local thickness or the rate of change of the thickness of the tube-like anatomical structure to generate a color-coded 3-D image of the surface such that an operator can select to display the surface color-coded to depict one or both of the thicknesses and the rate of change of the thicknesses, and
    a display device which displays the color-coded 3-D image.

12. The system of claim 11, wherein the tube-like anatomical structure includes an aorta and the processor is further programmed to:
    project the color-coded outer surface image onto a virtual cylindrical surface to generate a color-coded cylindrical surface, the virtual cylindrical surface having a diameter between an inner surface diameter of the aorta and an external surface diameter of the aorta.

13. The system of claim 12, wherein the processor is further programmed to:
    project the cylindrical surface onto a 2D surface to generate a color-coded 2D surface, the display device displaying the 2D color-coded surface.

14. A medical apparatus comprising:
    a diagnostic imaging system which acquires a 3D image of a region of an aorta that has an abnormal aortic aneurysm;
    at least one computer processor programmed to:
       segment the 3D image of the aorta region to generate an outer surface image of an outer surface of the aorta and a lumen boundary image of a lumen boundary of the aorta,
       for each point on the outer surface image, compute a thrombus thickness between the outer surface and the lumen boundary of the aorta,
       map a rate of change of the thickness at each point to a corresponding color and colorizing the outer surface with the corresponding color to generate a color-code rate of thickness change image;

a display device which displays the rate of thickness change image.

15. The apparatus of claim 14, wherein the computer processor is further programmed to:
generate a virtual cylinder centered around the centerline, project the colorized outer surface of the aorta onto the virtual cylinder to generate a color-coded cylinder, the display device displaying the color-coded cylinder.

16. The apparatus of claim 15, wherein the computer processor is further programmed to:
unfold the virtual cylinder from a selected reference point to generate a color-coded 2D map, the display device displaying the color-coded 2D map.

* * * * *